(12) United States Patent
Chandel et al.

(10) Patent No.: US 12,487,910 B2
(45) Date of Patent: Dec. 2, 2025

(54) PREDICTING CODE COVERAGE WITHOUT EXECUTION

(71) Applicant: MICROSOFT TECHNOLOGY LICENSING, LLC., Redmond, WA (US)

(72) Inventors: Shubham Chandel, Seattle, WA (US); Colin Bruce Clement, Seattle, WA (US); Neelakantan Sundaresan, Bellevue, WA (US); Michele Tufano, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 372 days.

(21) Appl. No.: 18/204,691

(22) Filed: Jun. 1, 2023

(65) Prior Publication Data

US 2024/0403198 A1   Dec. 5, 2024

(51) Int. Cl.
*G06F 9/44* (2018.01)
*G06F 8/36* (2018.01)
*G06F 11/3668* (2025.01)

(52) U.S. Cl.
CPC ............ *G06F 11/3676* (2013.01); *G06F 8/36* (2013.01)

(58) Field of Classification Search
CPC .................................................. G06F 11/3676
USPC .......................................................... 717/124
See application file for complete search history.

(56) References Cited

FOREIGN PATENT DOCUMENTS

WO    2022046213 A1    3/2022

OTHER PUBLICATIONS

International Search Report and Written Opinion received for PCT Application No. PCT/US2024/030680, Sep. 6, 2024, 16 pages.
She, et al., "NEUZZ: Efficient Fuzzing with Neural Program Smoothing", IEEE Symposium on Security and Privacy (SP), Jul. 15, 2018, 13 pages.
Tufano, et al., "Predicting Code Coverage without Execution", arXiv preprint arXiv:2307.13383, Jul. 25, 2023, 12 pages.
Vasudevan, et al., "Learning Semantic Representations to Verify Hardware Designs", Part of Advances in Neural Information Processing Systems 34, Dec. 7, 2021, 14 pages.
Fraser, et al., "EvoSuite: Automatic Test Suite Generation for Object-Oriented Software", In Proceedings of the 19th ACM SIGSOFT Symposium and the 13th European conference on Foundations of Software Engineering, Sep. 5, 2011, pp. 416-419.
Ivanković, et al., "Code Coverage at Google", In Proceedings of 27th ACM Joint Meeting on European Software Engineering Conference and Symposium on the Foundations of Software Engineering, Aug. 12, 2019, pp. 955-963.
Johnson, Leslie A. (Schad), "DO-178B, Software Considerations in Airborne Systems and Equipment Certification", In Crosstalk Magazine, Oct. 1988, 11 Pages.

(Continued)

*Primary Examiner* — Evral E Bodden
(74) *Attorney, Agent, or Firm* — Workman Nydegger

(57) ABSTRACT

A code coverage prediction system utilizes a neural transformer model with attention to generate a sequence of coverage symbols given a focal method and a test case. The sequence of coverage symbols indicates whether a line of source code is covered by the test case, missed by the test case or unreachable. The sequence of coverage symbols is aligned with the focal method to produce a coverage-annotated focal method that associates a predicted coverage symbol with each line of source code in the focal method.

20 Claims, 11 Drawing Sheets

(56) References Cited

OTHER PUBLICATIONS

Lewis, et al., "BART: Denoising Sequence-to-Sequence Pre-training for Natural Language Generation, Translation, and Comprehension", In Repository of arXiv:1910.13461v1, Oct. 29, 2019, 10 Pages.
Palin, et al., "ISO 26262 safety cases: Compliance and assurance", In Proceedings of 6th IET International Conference on System Safety 2011, Sep. 20, 2011, pp. 1-6.
Rierson, Leanna, "Developing Safety-Critical Software: A Practical Guide for Aviation Software and DO-178C Compliance", In Publication of CRC Press, Dec. 19, 2017, 50 Pages.
Tikir, et al., "Efficient instrumentation for code coverage testing", In ACM SIGSOFT Software Engineering Notes, vol. 27, No. 4, Jul. 1, 2002, pp. 86-96.
Tufano, et al., "Unit test case generation with transformers", In Repository of arXiv:2009.05617v1, Sep. 11, 2020, 11 Pages.
Vaswani, et al., "Attention Is All You Need", In Proceedings of Advances in Neural Information Processing Systems., Dec. 4, 2017, pp. 5998-6008.

PREDICTING CODE COVERAGE WITHOUT EXECUTION

BACKGROUND

Software testing is an essential part of the software development life-cycle and is used to ensure that program bugs are detected and fixed prior to releasing a software product. Code coverage is a metric widely-used to estimate the quality of the testing of the software. Code coverage measures which program elements, such as statements or branches, have been executed by a set of test cases. A higher percentage of program elements covered by the test cases is indicative of a high-quality test case and a lower risk of software bugs residing in the program. Code coverage provides a certain level of confidence that the system will operate conforming to specified requirements.

Code coverage is implemented by instrumenting the source code and executing the code with the test cases while monitoring the code execution. The instrumented code provides counters that record the statements that have been executed by the test cases. This process requires having the resources needed to instrument, build, and execute the program. It is expensive for large software projects where a considerable amount of computing resources and time is needed to instrument, build and execute the program. It is not always possible to build and execute the program for a small portion of the source code when the entire program is not available.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A code coverage prediction system utilizes a neural transformer model with attention to generate a sequence of code coverage symbols given a focal method and a test case. The code coverage symbols indicate whether a line of source code is covered by the test case, missed by the test case or unreachable. The sequence of coverage symbols is aligned with the focal method to produce a coverage-annotated focal method that associates a predicted coverage symbol with each line of source code in the focal method.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
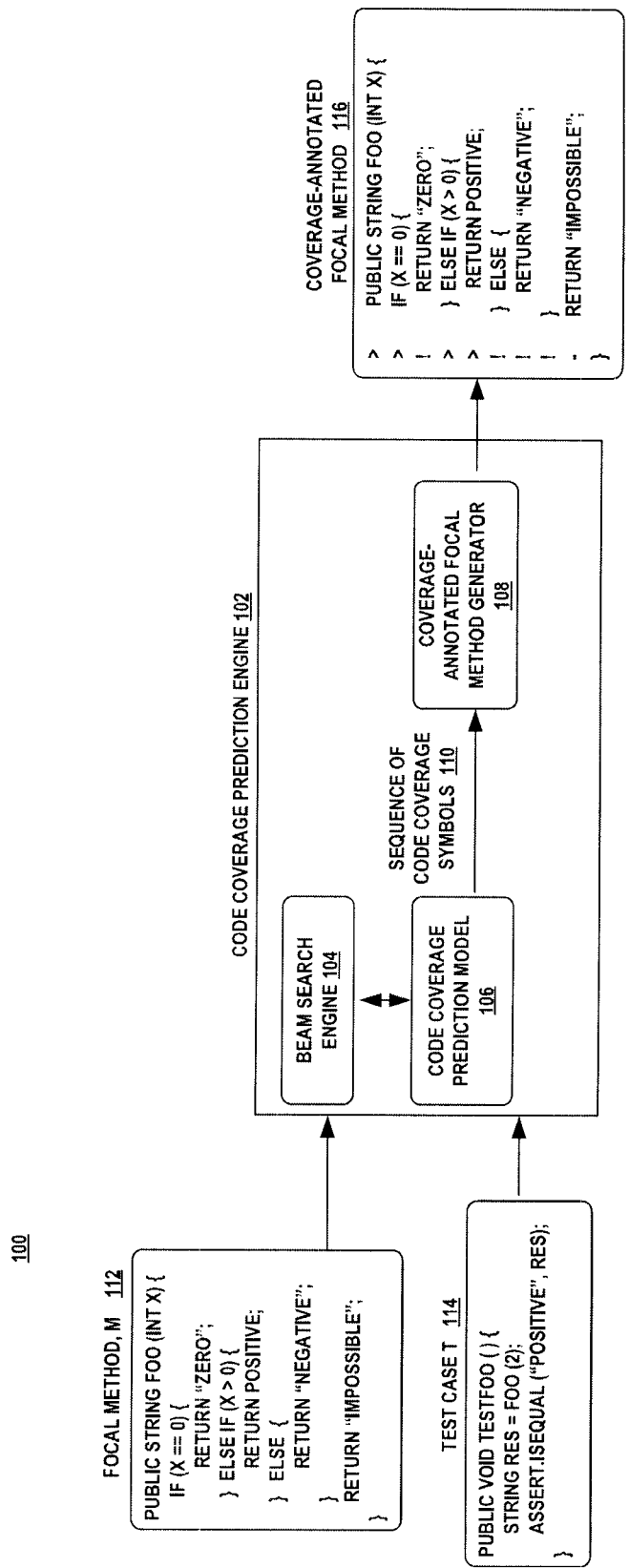
FIG. 1 illustrates a first exemplary embodiment of a system for predicting code coverage without execution.

Aspects disclosed herein relate to predicting code coverage of a source code snippet without building or executing the software program containing the source code snippet. A large language model, given a focal method and a corresponding test case, predicts whether statements and branches in the focal method would be executed by the test case, missed by the test case or are unreachable.

A method is a self-contained module of source code within a larger program that is bundled together to achieve a specific outcome. The method is not the entry point of program execution (i.e., main( )). A test case is a source code snippet containing instructions and assertions that verify the functionality and behavior of a source code component, such as a method body. A focal method is a method subject to a test case.

Given a focal method m, composed of n statements $S_m = s_1, s_2, \ldots, s_n$, and a test case t which executes the method m, the coverage-annotated focal method is composed of a sequence of n statements $S_m^t = s_1^*, s_2^*, \ldots, s_n^*$, where each statement $s_i^*$ represents the coverage-annotated statement of $s_i$ in m. Specifically, $s_i^*$ is marked with one of three coverage symbols $c \in \{>, !, -\}$, where the symbol > identifies statements that have been executed by t, the symbol ! identifies statements that have been missed by t, and the symbol − identifies statements that are unreachable.

A large language model, given a focal method m and test case t which executes m, generates the sequence of coverage-annotated statements $S_m^t$ by predicting the sequence of n code coverage symbols $C_m^t = c_1, c_2, \ldots, c_n$, where $c_i \in \{>, !, -\}$. The sequence is then combined with the original sequence of statements $S_m = s_1, s_2, \ldots, s_n$, to obtain the coverage annotated sequence of statements $S_m^t = s_1^*, s_2^*, \ldots, s_n^*$. The final step is performed by aligning the two sequences and obtaining $s_i^* = c_i + s_i$, where the + operation refers to string concatenation.

In an aspect, the large language model is utilized in a software development system, such as an integrated development environment or source code editor, to provide real-time or live coverage prediction for developers. While a developer is writing tests for a given focal method, the system utilizes the large language model to provide code coverage information where source code lines covered by the tests are marked with a ">" character, the source code lines missed by the tests are marked with a "!" character, and lines of source code that are unreachable are marked with a "−" character. The predictions made by the large language model concerning code coverage of the unit tests does not require the entire codebase to be built and does not require the tests to be executed.

In another aspect, the large language model is deployed in a test generation system that generates unit tests for a given method. A developer while working in a software development system utilizes the test generation system to generate the unit tests given a focal method. The test generation system utilizes the large language model to predict the code coverage of the tests. If the test coverage is not satisfactory, additional tests are generated until the target coverage threshold is achieved. The test generation system is beneficial in automatically generating test cases that meet a target coverage threshold.

Attention now turns to a description of the system for automating the test-driven development using a neural transformer model.

System

FIG. 1 illustrates a block diagram of an exemplary system 100 that predicts code coverage of a source code snippet without building or execution the source code program containing the source code snippet. In an aspect, shown in FIG. 1, system 100 includes a code coverage prediction engine 102 that includes a beam search engine 104, a code coverage prediction model 106, and a coverage-annotated focal method generator 108. The code coverage prediction model 102 is a large language model trained to predict a sequence of code coverage symbols 110 given a focal method m, 112, and a test case t, 114. The coverage-annotated focal method generator 108 aligns the sequence of code coverage symbols 110 with the original sequence of statements of the focal method 112 into a coverage-annotated focal method 116.

As shown in FIG. 1, the focal method 112 contains a method Foo and has an associated test case 114 which contains a unit test for the positive results. The code coverage prediction engine 102 generates the sequence of code coverage symbols 110 which are aligned with their respective source code statements. As shown in the coverage-annotated focal method 116, the return "zero" statement and the return "negative" statement have no test coverage and are marked with the '!' character, the return "impossible" statement is unreachable and marked with the '−' character, and the statements marked with the '>' character are covered by the test case.

In an aspect, the code coverage prediction model is a deep machine learning model, such as without limitation, a neural transformer model with attention, a memory efficient transformer (e.g., Poolingformer), and other neural models having an attention mechanism. A deep machine learning model differs from traditional machine learning models that do not use neural networks. Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes statistical techniques, data mining, Bayesian networks, Markov models, clustering, support vector machine, and visual data mapping.

Deep machine learning differs from traditional machine learning since it uses multiple stages of data processing through many hidden layers of a neural network to learn and interpret the features and the relationships between the features. Deep machine learning embodies neural networks which differs from the traditional machine learning techniques that do not use neural networks. There are various types of deep machine learning models that generate source code, such as recurrent neural network (RNN) models, convolutional neural network (CNN) models, long short-term memory (LSTM) models, and neural transformers with attention.

A neural transformer model with attention uses an attention mechanism to relate the significance of different positions of an input embedding sequence to compute a representation of the sequence. Attention is used to decide which parts of the input embedding are important for each token, especially when decoding long sequences since the encoder is limited to encoding a fixed-size vector. Attention mechanisms gather information about the relevant context of a given token and then encode that context into a vector which represents the token. It is used to identity the relationships between tokens in the long sequence while ignoring other tokens that do not have much bearing on a given prediction.

Figure 2A:
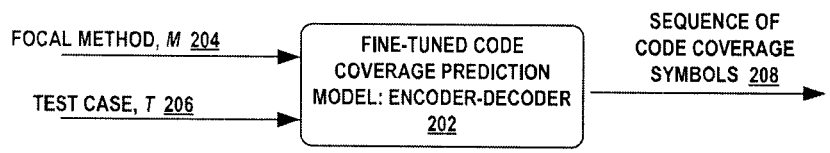
FIGS. 2A-2D are schematic diagrams illustrating various configurations of the code coverage prediction model and associated training datasets.

The code coverage prediction model may be implemented in different configurations. Referring to FIG. 2A, in one aspect, the code coverage prediction model 202 is a neural transformer model with attention configured to perform a sequence-to-sequence task that translates an input sequence consisting of a focal method m 204 and test case t 206 into an output sequence consisting of n coverage symbols $C_m^t = c_1, c_2, \ldots, c_n$, where $c_i \in \{>, !, -\}$ 208. The model 202 employs an encoder-decoder configuration where the encoder encodes the input sequence into an internal representation and the decoder blocks decode the internal representation into the output sequence. The neural transformer model with attention is pre-trained on an unsupervised training dataset of natural language text, then pre-trained on an unsupervised training dataset of source code programs, and fine-tuned on a supervised dataset of tuples, where each fine-tuning tuple consists of a focal method and test case, m+t, with a known sequence of coverage symbols, $C_m^t$.

Figure 2B:
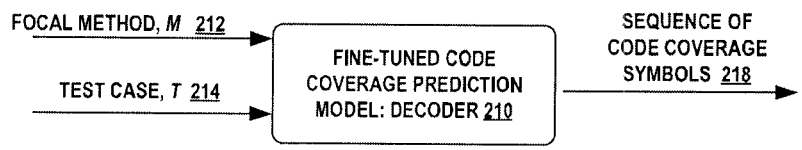

Referring to FIG. 2B, in an aspect, the code coverage prediction model 210 is a neural transformer model with attention in a decoder-only configuration. In the decoder-only configuration, the model predicts code coverage as a continuation task where the model outputs one token at a time based on the outputs of the previous time steps. At inference, the model is given a focal method m 212 and a test case t 214 and outputs a predicted sequence of code coverage symbols, $C_m^t$ 218.

The model is pre-trained on an unsupervised training dataset of natural language text, then pre-trained on an unsupervised training dataset of source code programs, and fine-tuned on a supervised dataset of tuples, where each fine-tuning tuple consists a focal method m, an associated test case t, and an annotated coverage cov(m, t). The annotated coverage cov(m, t) is produced from a coverage report obtained from execution of the test case. The annotated coverage indicates which lines of source code are covered by the test case and which lines of source code are not covered by the test case.

Figure 2C:
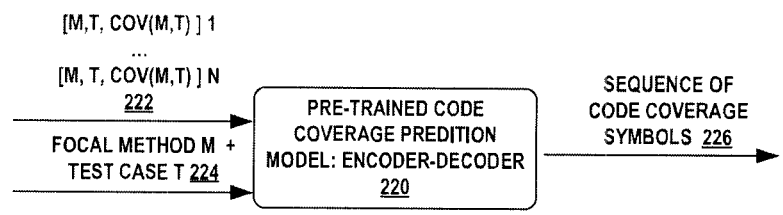

Referring to FIG. 2C, in an aspect, the code coverage prediction model may be a neural transformer model with attention 220 structured in an encoder-decoder configuration. The model is pre-trained on an unsupervised training dataset of natural language text and then pre-trained on an unsupervised training dataset of source code programs. The model 220 is not fine-tuned on a translation task. Instead during inference, a few-shot examples are inserted into the input sequence or prompt that describes the translation task and guides the model to perform the correct output. The few-shot examples 222 include n tuples where each tuple consists of a focal method m, its corresponding test case t, and a corresponding annotated coverage cov(m,t). The input sequence or prompt includes the n few-shot examples 222 along with the focal method m and corresponding test case t 224. The model outputs a predicted sequence of code coverage symbols, $C_m^t$ 226.

Figure 2D:
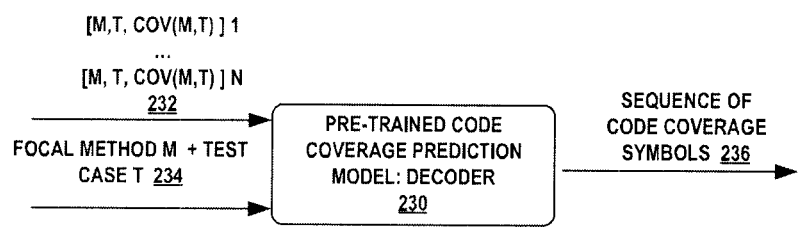

Referring to FIG. 2D, in an aspect, the code coverage prediction model 230 is configured as a decoder-only neural transformer model with attention that performs an autoregressive completion task. The model is pre-trained on an unsupervised training dataset of natural language text and then pre-trained on an unsupervised training dataset of source code programs. The model 230 is not fine-tuned on the completion task. Instead, a few-shot examples 232 are inserted into the input sequence or prompt that describe the task and guide the model towards the correct output. The few-shot examples 232 include n tuples where each tuple consists of a focal method m, the corresponding test case t, and the corresponding annotated coverage cov(m, t). The input sequence or prompt includes the n few-shot examples 232 along with the focal method m, and the corresponding test case t. The model outputs a predicted sequence of code coverage symbols, $C_m^t$ 236.

Attention now turns to more detailed description of the neural transformer models with attention.

Figure 3:
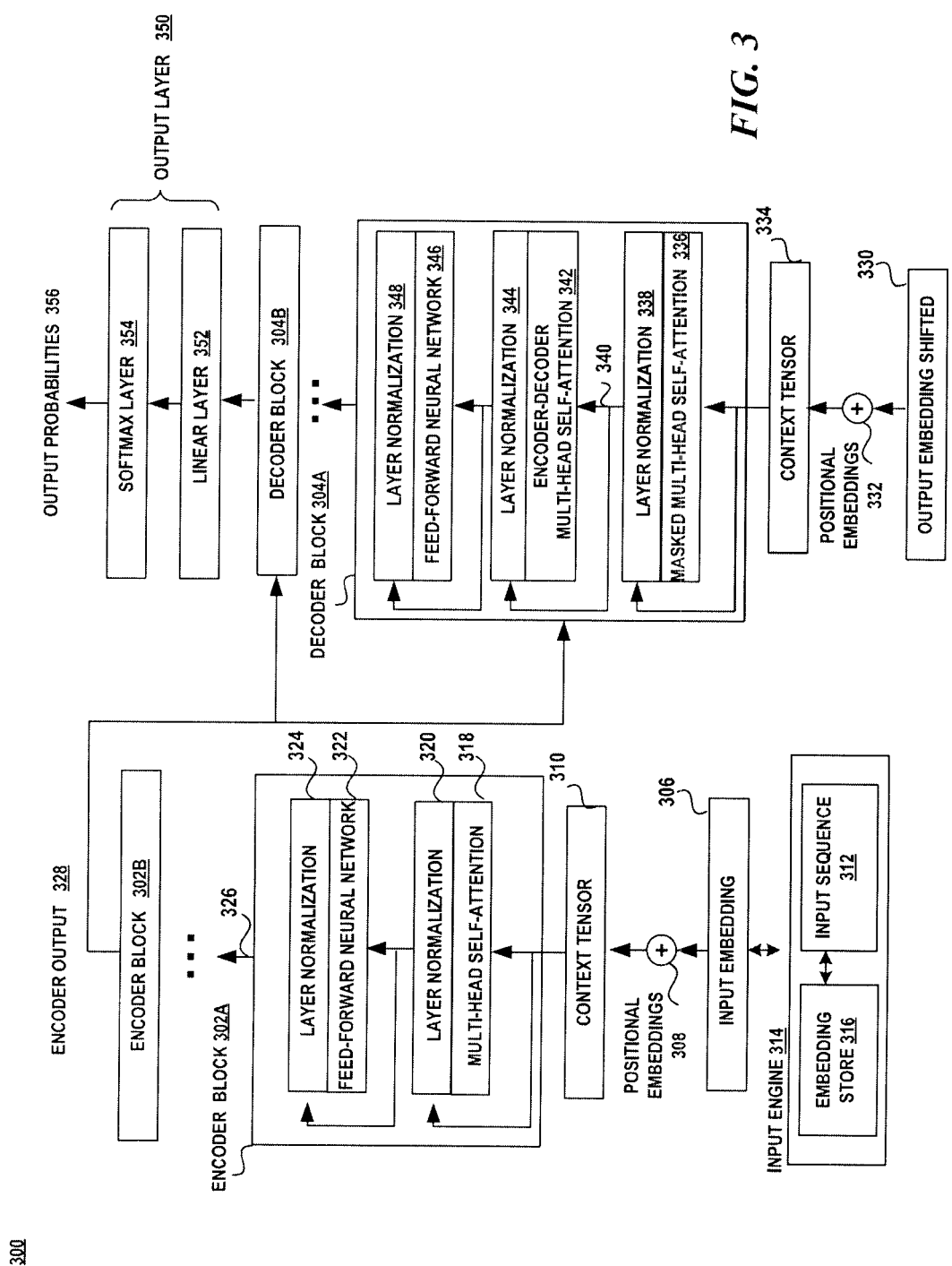
FIG. 3 illustrates an exemplary code coverage prediction model configured as an encoder-decoder neural transformer model with attention.

FIG. 3 shows an exemplary structure of the code coverage prediction model as a neural transformer model with attention in an encoder-decoder configuration. The neural transformer model with attention 300 contains one or more encoder blocks 302A-302B ("302") and one or more decoder blocks 304A-304B ("304"). The input layer to the first encoder block 302A includes an input embedding layer 306, a positional embedding layer 308, and a context tensor 310.

The initial inputs to the first encoder block 302A are the input embeddings 306 of the input sequence 312. The input engine 314 generates the input embedding 306 for the input sequence 312 from the embeddings 316 generated by the model during training. In order to retain the order of the tokens in the input sequence 312, positional embeddings 308 are added to the input embedding 306 forming a context tensor 310. The initial input to the first decoder block 304A is a <START> token and at each subsequent time step the input is a shifted sequence of the output embeddings 330 from the previous time step to which the positional embeddings 332 are added forming context tensor 334.

An encoder block 302 consists of two layers. The first layer includes a multi-head self-attention component 318 followed by layer normalization component 320. The second layer includes a feed-forward neural network 322 followed by a layer normalization component 324. The context tensor 310 is input into the multi-head self-attention layer 318 of the encoder block 302 with a residual connection to layer normalization 324. The output of the layer normalization 320 is input to the feed-forward neural network 322 with another residual connection to layer normalization 324. The output of the encoder block 302 is a set of hidden representations 326. The set of hidden representations 326 is then sent through additional encoder blocks, if multiple encoder blocks exist, or to the decoder 328.

Attention is used to decide which parts of the input sequence are important for each token, especially when decoding long sequences since the encoder is limited to encoding a fixed-size vector. Attention mechanisms gather information about the relevant context of a given token and then encode that context into a vector which represents the token. It is used to identity the relationships between tokens in the long sequence while ignoring other tokens that do not have much bearing on a given prediction.

The multi-head self-attention component 318 takes a context tensor 310 and weighs the relevance of each token represented in the context tensor to each other by generating attention weights for each token in the input embedding 306. In one aspect, the attention function is scaled dot-product attention which is described mathematically as follows:

$$\text{Attention } (Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with $d_v$ output values which are concatenated to a final value:

$$\text{MultiHead}(Q,K,V)=\text{Concat}(\text{head}_1, \ldots ,\text{head}_h)W^O,$$

where $\text{head}_i=\text{Attention}(QW_i^Q,KW_i^K,VW_i^V)$, with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural transformer, layer normalization is used between the layers. The layer normalization component normalizes the inputs across the features. The mean and standard deviation is computed across the feature dimensions. There is a first layer normalization 320 that precedes the feed-forward neural network 322 and a second layer normalization 324 that follows the feed-forward neural network 322.

The feed-forward neural network 322 processes each output encoding separately. The output of the top encoder block is a set of attention vectors K and V 328 which is used by the encoder-decoder multi-head self-attention layer 342 of each decoder block 304.

The decoder block 304 predicts each token $t_i$ in the target language one-by-one at each time step conditioned on all previously-generated target tokens $t_1, \ldots t_{i-1}$. The decoder block 304 consists of three layers. The first layer includes a masked multi-head self-attention component 336 followed by a layer normalization component 338. The output of the layer normalization component 338 is input into the encoder-decoder multi-head attention component 342 with a residual connection to layer normalization component 344. The second layer includes an encoder-decoder multi-head self-attention component 342 followed by a layer normalization component 348. The output of layer normalization component 348 is input into the feed-forward neural network 346 with a residual connection to layer normalization component 348. The third layer includes a feed-forward neural network 346 followed by a layer normalization component 348.

The masked multi-head self-attention component 336 receives the output embeddings of the previous timestep. The masked multi-head self-attention component 336 masks the output embeddings from future time steps. The encoder-decoder multi-head self-attention layer 342 receives queries from the previous decoder layer and the memory keys and values from the output of the encoder block 328. In this manner, the decoder block 304 can attend to every position of the input sequence. The feed-forward neural network 346 processes each output encoding separately. A layer normalization component 338, 344, 348 is used between the layers in order to normalizes the inputs across the features.

The output layer 350 includes a linear layer 352 and a softmax layer 354. The linear layer 352 projects the vector produced by the stack of decoders into a logits vector. The softmax layer 354 then turns the scores of the logits vector into output probabilities for each token in the vocabulary V which are positive and normalized 356.

An embedding is a learned representation for the text-based tokens/subtokens where tokens or subtokens that have a common meaning have a common representation. Initially, random values are used for the initial values of each token/subtoken embedding and positional embedding. Thereafter, the neural transformer model 300 learns the values for each embedding. Upon the completion of the training phase, the embeddings for each token and the position embeddings are saved into respective matrices for later use in the interference phase. There is a token embedding matrix that contains an embedding vector for each token in the model's vocabulary and a positional embedding matrix that contains an embedding vector for each position. The token embedding matrix and the positional embedding matrix are stored in embedding store 316.

Figure 4:
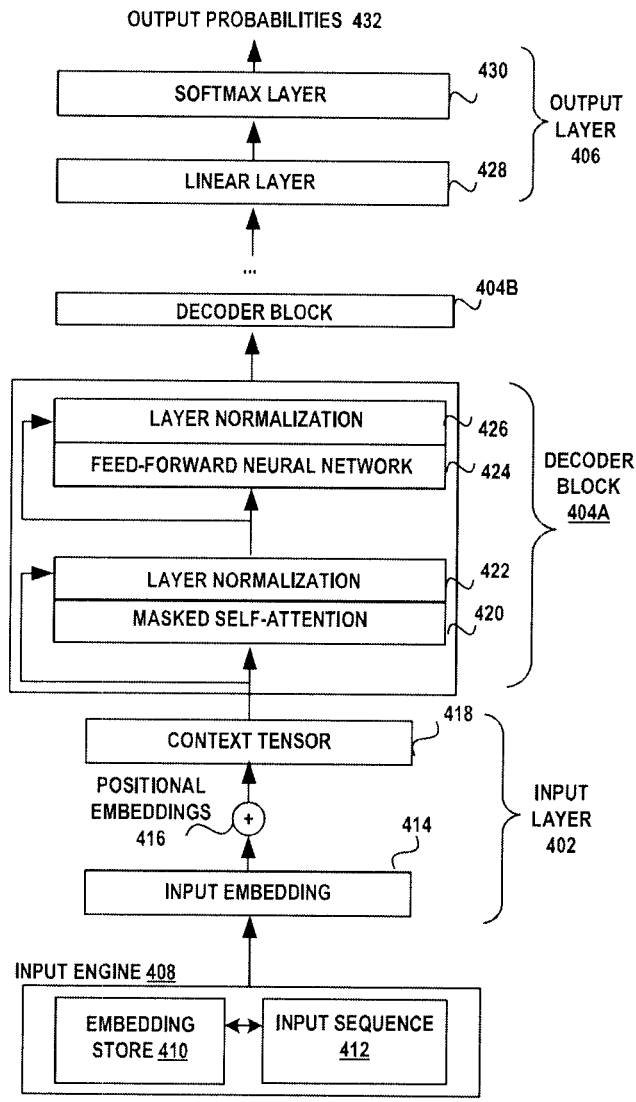
FIG. 4 illustrates an exemplary code coverage prediction model configured as a decoder-only neural transformer model with attention.

FIG. 4 shows an exemplary structure of the neural transformer model with attention in a decoder-only configuration 400. The decoder neural transformer model 400 includes an input layer 402, one or more decoder blocks 404A-404B ("404"), and an output layer 406. The input layer 403 receives an input embedding 414. The input engine 414 generates the input embedding 414 for an input sequence 412 from the token embeddings 410 generated by the model during training.

A decoder block 404 consists of two layers. The first layer includes a masked self-attention component 420 followed by a layer normalization component 422. The input to the masked multi-head self-attention component has a residual connection to layer normalization 426. The output of layer normalization 422 is input into the feed-forward neural network 424 with a residual connection to layer normalization component 426. The output of the feed-forward neural network 424 is input into layer normalization component 426.

Each token/subtoken flows through all the decoder blocks along its own path. The masked self-attention component 420 allows the feed-forward neural network 424 to focus on certain features or inputs. The input embedding 414 to the decoder block 404 is added with the positional embeddings 416 forming context tensor 418. The decoder block 404 predicts each token/subtoken $t_i$ in the target language one-by-one at each time step conditioned on all previously-generated target tokens/subtokens $t_1, \ldots t_{i-1}$.

The masked self-attention component 420 masks the input embeddings from future time steps. The feed-forward neural network 424 processes each input embedding separately. The layer normalization components 422, 426 are used between the layers in order to normalize the inputs across the features.

The linear layer 428 projects the vector produced by the stack of decoders into a logits vector. The softmax layer 430 then turns the scores of the logits vector into probabilities for each token in the vocabulary which are positive and normalized.

Figure 5:
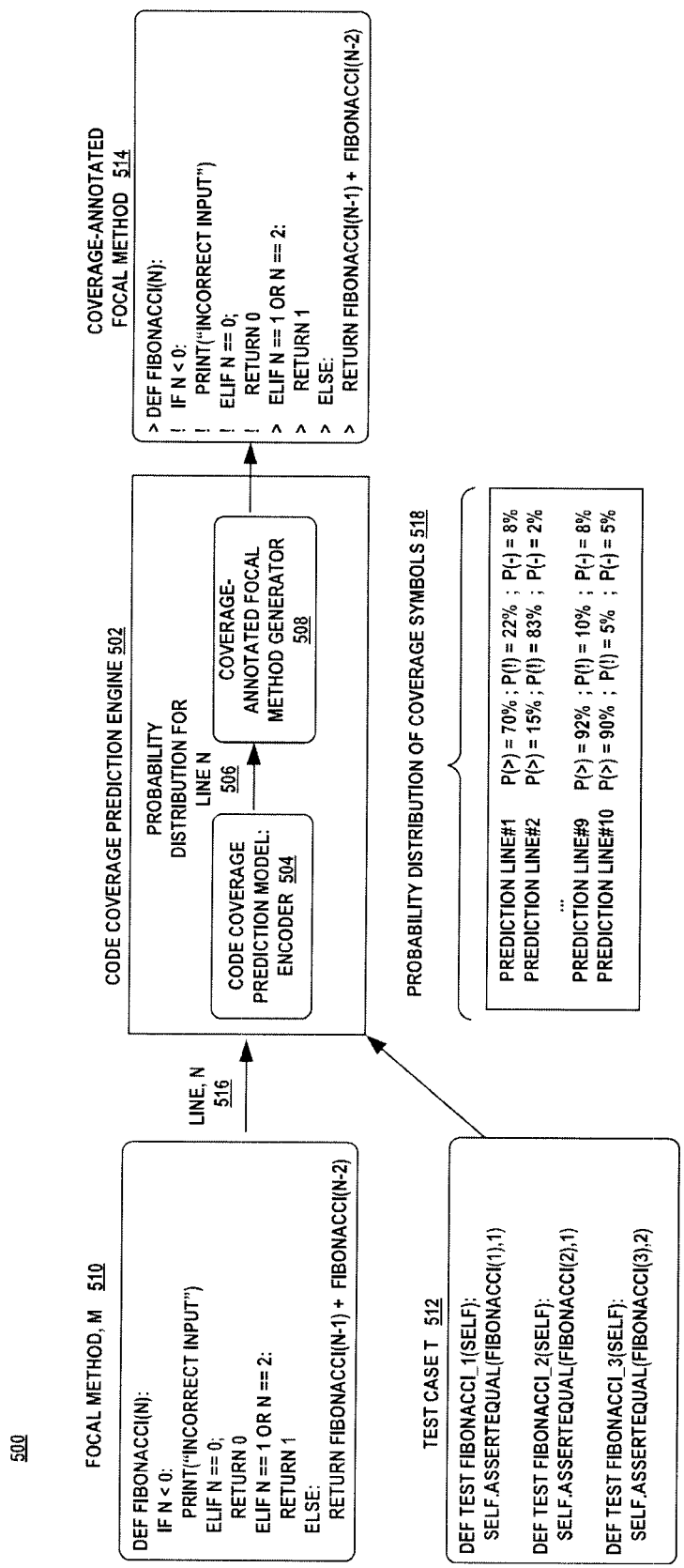
FIG. 5 illustrates a second exemplary embodiment of a system for predicting code coverage without execution.

FIG. 5 shows a second embodiment of the code coverage prediction engine 500 performing code coverage prediction as a classification task utilizing an encoder-only neural transformer model with attention. The model is pre-trained on natural language text and source code to learn contextualized word embeddings that capture rich semantic information. The model is then fine-tuned on quadruplets including: (i) a focal method m, (ii) a corresponding test case t, (iii) current line number to be considered, (iv) and the corresponding annotated coverage cov symbol for the specific line number. This fine-tuning is performed considering each and every individual line in the method m, and the model is trained to predict the correct class, among three classes, each class corresponding to a possible coverage symbol $\{>,!,-\}$.

In this embodiment, the code coverage prediction engine 500 includes the code coverage prediction model configured as an encoder neural transformer model with attention 504 and the coverage-annotated focal method generator 508. The model processes each line serially. The code coverage prediction model 504 is given a single source code statement of the focal method, line n 516 and test case t 512 and generates a probability distribution for the coverage symbols for the line 516.

In box 518, there is shown an exemplary output of the code coverage prediction engine 500. The code coverage production engine 500 makes a code coverage prediction for each source code statement or line and test case 512 with respect to each class or code coverage symbol. As shown in box 518, the predicted output by the model 504 for the first statement of the focal method 510, defFibonacci(n); is the probability distribution, $P(>)=70\%$, $P(!)=22\%$, and $P(-)=8\%$, which indicates that the first statement is likely to be tested by the test case since $P(>)$ is 70%. The predicted output for the second statement, If N>0: , is the probability distribution $P(>)=15\%$, $P(!)=83\%$, and $P(-)=2\%$, which indicates that the second statement is not likely to be tested by the test case since $P(!)$ is 83%. The predicted output for the ninth statement and tenth statements indicates that these statements are likely to be tested by the test case since the probability for $P(>)$ in each case is the highest.

Figure 6:
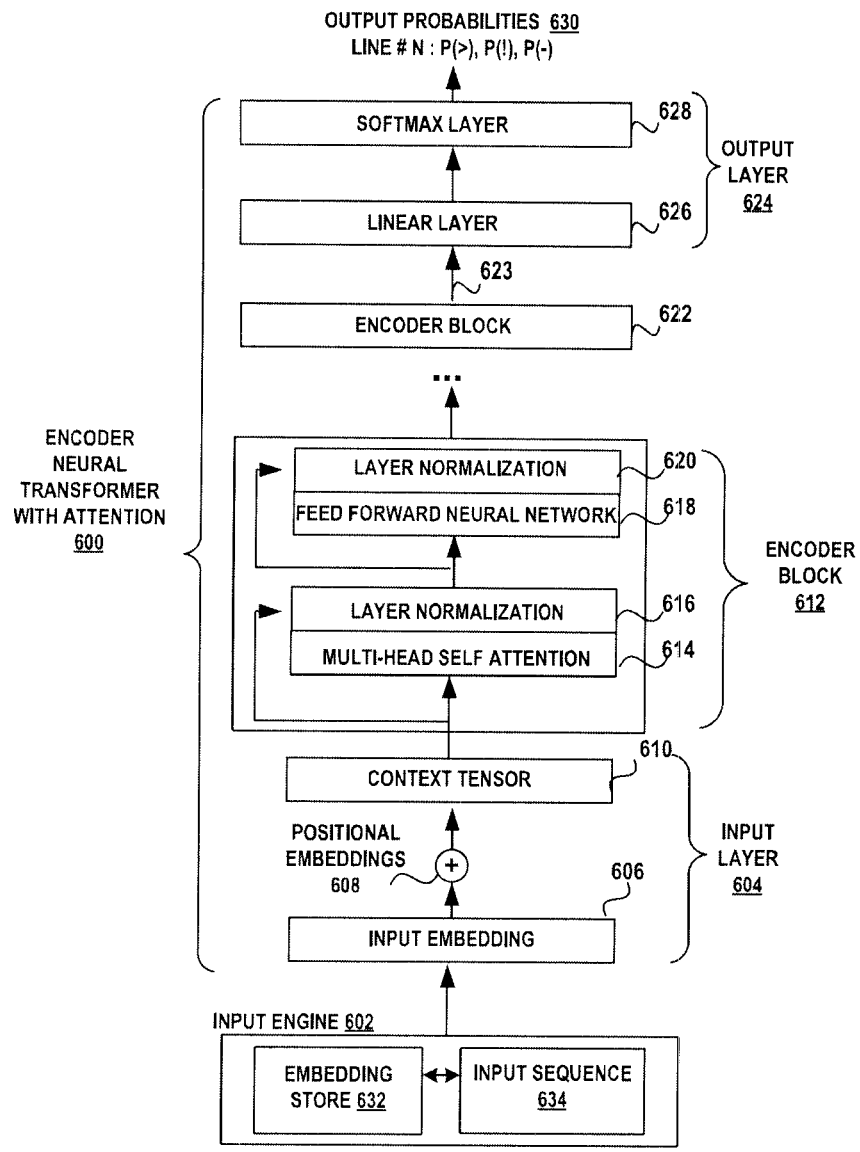
FIG. 6 illustrates an exemplary code coverage prediction model configured as an encoder neural transformer model with attention.

FIG. 6 illustrates an exemplary neural transformer model with attention in an encoder-only configuration 600. The encoder neural transformer 600 includes an input layer 604, one or more encoder blocks 612, and an output layer 624. The input layer 604 includes input embeddings 606 of an input sequence 634 and positional embeddings 608 that represents an order of the tokens/subtokens in an input sequence 634. The input engine 602 generates the input embedding using the token embeddings 632 generated from the model's training. The input embeddings 606 and the positional embeddings 608 are combined to form a context tensor 610.

An encoder block 612 consists of two layers. The first layer includes a multi-head self-attention component 614 followed by layer normalization component 616. The second layer includes a feed-forward neural network 618 followed by a layer normalization component 620. The context tensor 610 is input into the multi-head self-attention layer 614 of the encoder block 612 with a residual connection to layer normalization 616. The output of the layer normalization 616 is input to the feed-forward neural network 618 with another residual connection to layer normalization 620. The output of each encoder block is a set of hidden representations 623. The set of hidden representations 623 are then sent through additional encoder blocks, if multiple encoder blocks exist.

The output layer 624 consists of a linear layer 626 and a softmax layer 628. The linear layer 626 is a fully-connected neural network that projects the raw scores output by the last layer of the neural network into a logits vector. The softmax layer 628 applies the softmax function to the logits vector to compute a vector that represents the probability distribution of each code coverage symbol, P(>), P(!), and P(-) for each line of source code 630.

Methods

Attention now turns to a more detailed description of the methods used in the debugging tool system. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 7:
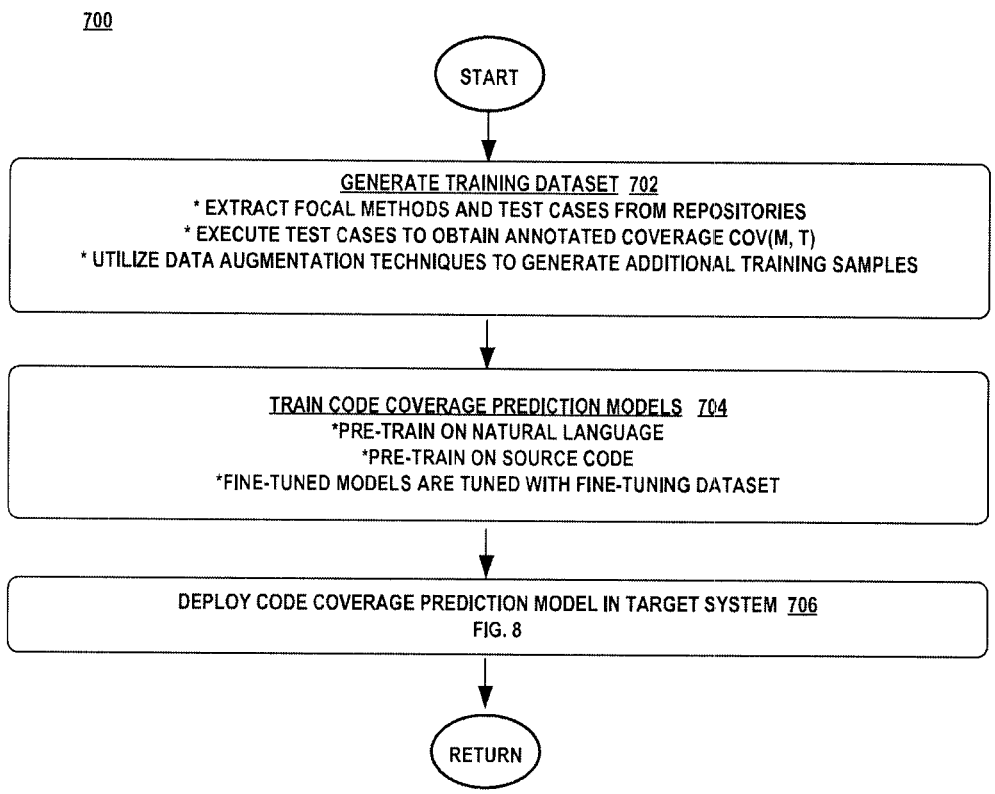
FIG. 7 is a flow diagram illustrating an exemplary method of the code coverage prediction system.

FIG. 7 illustrates an exemplary method for generating the code coverage prediction model 700. Turning to FIG. 7, training datasets are generated for the code coverage prediction model. In an aspect, one or more source code repositories are analyzed to discover and extract test cases. The test cases may be detected from annotations found in files. For examples, Java tests are marked with the @Test annotation, C #tests are marked with the annotations [Test], [TestMethod], [Fact], [Theory] based on the testing framework used by the developers, and Python tests are usually defined using the prefix test_ in their signature. (Collectively, block 702).

The extracted test cases are executed individually using a corresponding testing framework (e.g., JUnit, MSTest, pytest). A coverage computation and coverage report are obtained during the execution using tools such as Cobertura for Java, coverage.py for python and the coverage tool for MSTest. For each extracted test case, the coverage report is analyzed to extract the corresponding focal method and annotated coverage cov(m, t) producing a training sample that includes the focal method m, associated test case t, and/or annotated coverage cov(m, t). (Collectively, block 702).

In order to increase the number of training samples in a training dataset, random mutations are made to small sections of the source code according to mutation operators at select statements and branches of the tests and focal methods. A pair of focal method and test case is mutated and each new pair is executed to obtain the corresponding annotated coverage. Additionally, new tests may be generated by using automated test generation techniques, such as EvoSuite and AthenaTest. (Collectively, block 702).

Next, the code prediction model is trained. Training is the process where the model's parameters (i.e., embeddings, weights, biases) are learned from the training datasets. Training includes the pre-training and fine-tuning, if any. (Collectively, block 704).

The code coverage prediction models configured in the encoder-decoder and decoder configuration are pretrained on natural language text and pre-trained on source code. The natural language pre-training allows the model to learn the semantics of words and to understand the meaning of variable and method names when applied to code-related tasks. The source code pre-training allows the model to learn the syntax and properties of source code by recognizing patterns and code structure. (Collectively, block 704).

The pre-training of the encoder-decoder model is performed by corrupting the documents and then optimizing a reconstruction loss between the decoder's output and the original training sample. The encoder receives the corrupted sample and the model is trained to recontract the original training sample as output of the decoder. A denoising function, such as a span masking function, is then applied to each sequence that randomly masks out a subset of tokens and the masked span of tokens is replaced with a mask token, M. The model is trained with the masked sequences to learn to reconstruct the original sequence without the masked tokens. Various denoising functions may be such as token masking, token deletion, text infilling, sentence permutation, document rotation and the like. (Collectively, block 704).

The fine-tuned encoder-decoder code coverage prediction model is then fine-tuned with a fine-tuning dataset consisting of pairs of samples, where each sample includes a focal method and its corresponding test case. The fine-tuned decoder code coverage prediction model is fine-tuned with a fine-tuning dataset consisting of triplets, where each triplet includes a focal method m, a corresponding test case t, and a corresponding annotated coverage cov(m, t). (Collectively, block 704).

The encoder code coverage prediction model is pre-trained on natural language text and then on source code. The pre-training on natural language text is performed using a denoising function that randomly masks out a certain percentage of input tokens of each sample. The model learns to predict the original masked tokens based on the surrounding context. The model is then fine-trained on pairs of sentences to learn to predict whether the second sentence follows the first sentence. Each sentence contains a label indicating whether or not the second sentence follows the first or not. (Collectively, block 704).

At each training application, a respective training dataset is obtained and applied to the model. Neural transformer models are trained iteratively, making multiple passes over a training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process. (Collectively, block 704).

The neural transformer model has multiple blocks and layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned. (Collectively, block 704).

For each sequence of each batch in each epoch, the T-ordered sequences of subtokens are then mapped into numeric vectors and then into respective token embeddings and positional embeddings. Initial values are generated for the token embedding and positional embeddings of each sequence which are then used to form a context tensor. Thereafter, the neural transformer model learns the values for each embedding. Upon the completion of the pre-training phase, the embeddings for each token and the positional embeddings are saved into respective matrices for later use. There is a token embedding matrix, We, that contains an embedding vector for each token $t_i$, i=0 . . . V, and a positional embedding matrix, Wp, that contains an embedding vector $P_j$, j=0 . . . T, for each position, where V is the size of the vocabulary and T is the length of the token sequence. (Collectively, block 704).

The feed-forward neural networks in the encoder blocks and the decoder blocks are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 704).

Next, the neural transformer model with attention is validated. Before the neural transformer model with attention is trained, a set of hyperparameters is selected randomly and then tuned to achieve a desired performance. The neural transformer model with attention is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 704).

Upon completion of the model's training, the code coverage prediction model is deployed in a target system (block 706).

Inference

Attention now turns to discussion of the use of the code coverage prediction model in an inference system.

Figure 8:
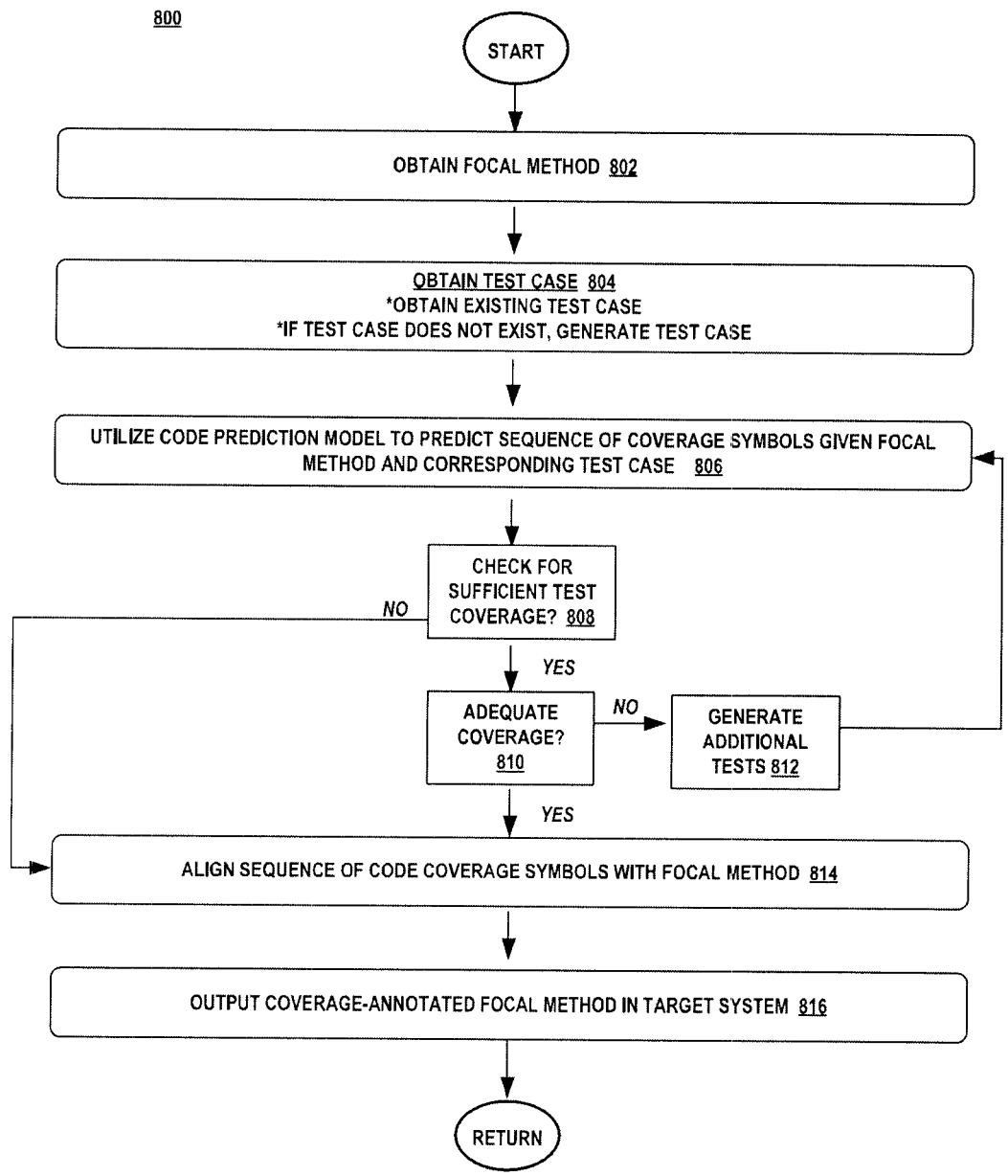
FIG. 8 is a flow diagram illustrating an exemplary method of predicting a coverage-annotated focal method.

Turning to FIG. 8, there is shown an exemplary method 800 for generating a coverage-annotated focal method in a target system. The target system may receive a focal method (block 802) and a corresponding test case (block 804). The test case may already exist or may need to be generated. The test case may contain one or more tests, such as a unit test. A unit test is a way of testing a smallest unit of code that can be logically isolated in a program.

In an aspect, the test case may not exist and need to be generated using a large language model given the focal method. The large language model is a deep machine learning model having billions of parameters trained on source code and/or natural language text. Examples of the large language model include OpenAI's GPT models, OpenAI Codex used within GitHub Copilot and Visual Studio, CodeBERT from Microsoft, AthenaTest from Microsoft specific for test generation, and the like. (Collectively, block 804).

The target system uses the code coverage prediction model to predict a sequence of code coverage symbols given the focal method and test suite (block 806). For the code coverage prediction models in the encoder-decoder configuration and the decoder configuration, a beam search is used to generate the sequence of code coverage symbols using the model to predict the most likely k tokens to follow the preceding predicted output tokens. The beam search uses the probability distributions generated by the code prediction model neural transformer model with attention to identify the top k tokens likely to be the next token in a candidate sequence. The beam search expands the search by instantiating new partial sequences using each of the selected tokens identified by the neural transformer model's probability distribution. The search continues generating new partial sequences from the top k tokens identified by the output distributions from the neural transformer model until the search ends. The search may end when the end-of-sequence token appears as the most probable next token. (Collectively, block 806).

A beam search uses a breadth-first search to build a search tree. The search tree is composed of nodes at one or more inference levels. Each node represents a probability distribution generated by the neural transformer model for the tokens in the model vocabulary. At each level, only the top k tokens having the highest probabilities from the output distribution generated by the neural transformer model with attention are expanded to the next inference level. The variable k is preconfigured and referred to as the beam width. Each of the k tokens is then expanded into a search that updates the current coverage symbol sequence with the selected token to input into the neural transformer model with attention to generate an additional probability distribution for the next token in a sequence. This process is repeated until the end-of-sequence token is predicted as being the next likely token candidate. (Collectively, block 806).

For the encoder code coverage prediction model, the model receives each line of the focal method and the test case and outputs a probability distribution for the source code line. At the end of the process, the code coverage symbol having the highest-probability is chosen for each line. The code coverage symbol for each line is prepended to the respective line in the focal method thereby generating the coverage-annotated focal method. (Collectively, block 806).

In some aspects, a coverage threshold is used to determine whether the test case adequately covers the focal method (block 808—yes). If the test case does not meet the coverage threshold (block 810—no), additional tests are generated (block 812) and the test coverage of the added tests are analyzed (block 806). If the test case meets the coverage threshold (block 810—yes) and there is no coverage threshold (block 808—no) then the predicted sequence of coverage symbols is aligned with the focal method to produce the coverage-annotated focal method (block 814) which is output in the target system (block 816).

Figure 9:
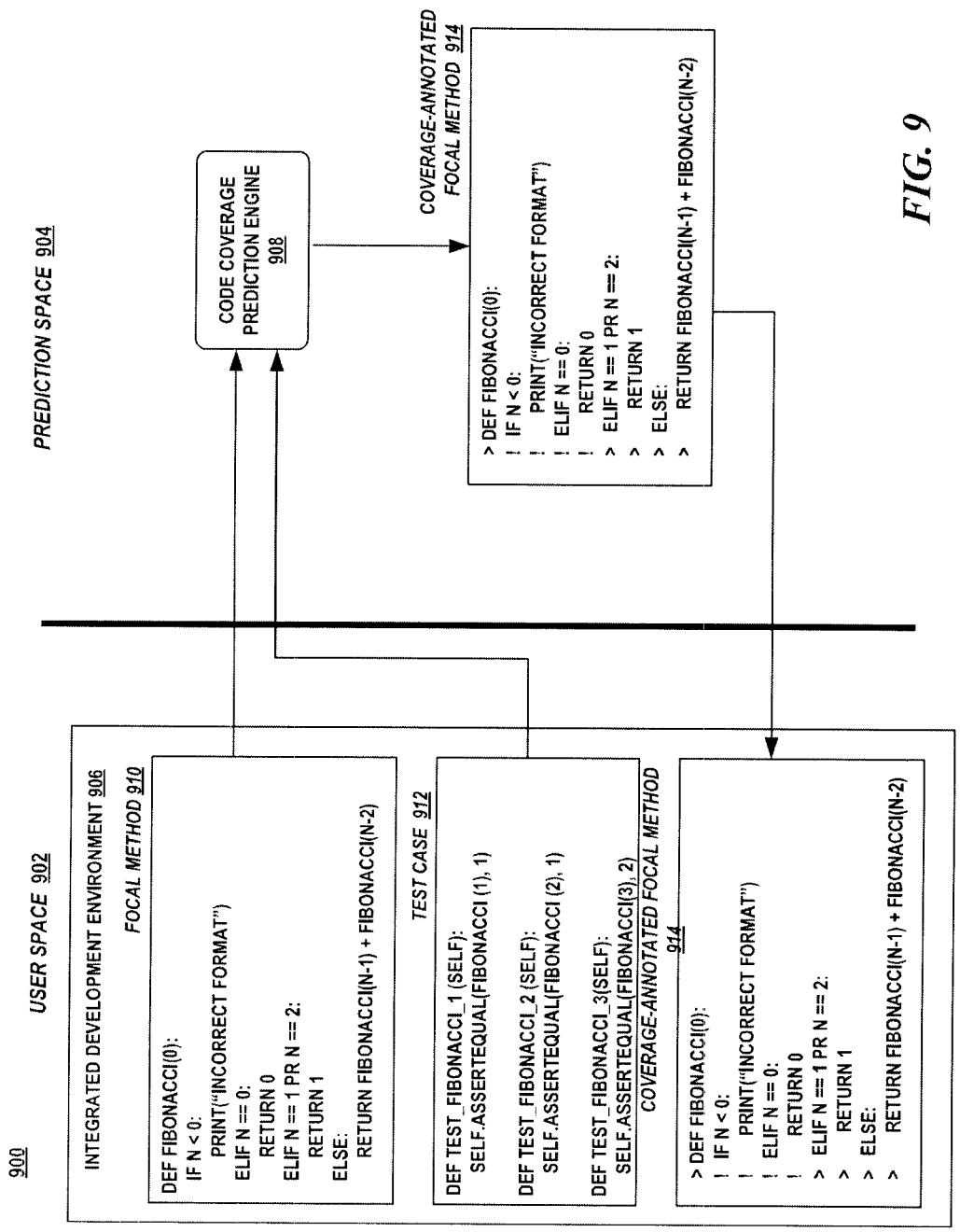
FIG. 9 is an exemplary embodiment of the coverage prediction system communicatively coupled with an integrated development environment.

Attention now turns to exemplary illustrations of the code coverage prediction engine deployed in various target systems. Turning to FIG. 9, there is shown a first exemplary code coverage prediction system 900. The system 900 operates with a user space 902 and a prediction space 904. The user space is the computing environment of a developer or user that is developing or maintaining a source code program in a software development tool, such as an integrated development environment, source code editor, or the like. The prediction space 904 is the computing environment of the code coverage prediction engine.

In an aspect, the user space 902 and the prediction space 904 are located in different computing devices. In another aspect, the user space 902 and the prediction space 904 are located in the same computing device and share resources. In another aspect, the user space 902 and the prediction space 904 are located in the same computing device but are in execution environments that are isolated from each other, such as in separate virtual machines or sandboxes.

In the user space 902, a developer operates in an integrated development environment 906 and transmits a focal method 910 and associated tests 912 to the code coverage prediction engine 908. The code coverage prediction engine 908 generates a coverage-annotated focal method 916 which is returned back to the integrated development environment 914.

Figure 10:
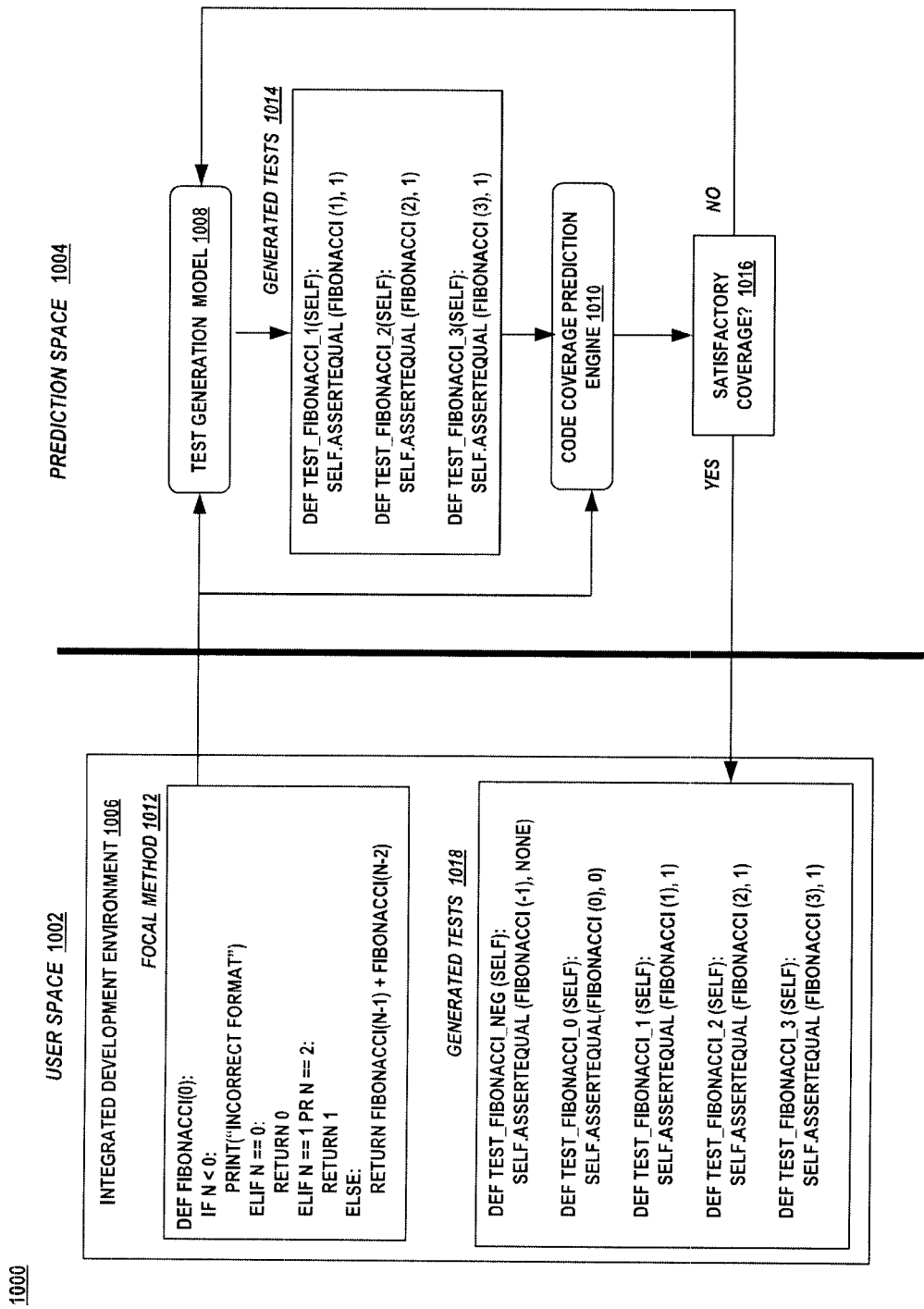
FIG. 10 is an exemplary embodiment of the coverage prediction system integrated with a test generation system.

Turning to FIG. 10, there is shown a second exemplary code coverage prediction system 1000. The system 1000 operates with a user space 1002 and a prediction space 1004. The user space 1002 is the computing environment of a developer or user that is developing or maintaining a source code program in a software development tool, such as an integrated development environment, source code editor, or the like. The prediction space 1004 is the computing environment of a test generation model 1008 and the code coverage prediction engine 1010.

In an aspect, the user space 1002 and the prediction space 1004 are located in different computing devices. In another aspect, the user space 1002 and the prediction space 1004 are located in the same computing device and share resources. In another aspect, the user space 1002 and the prediction space 1004 are located in the same computing device but are in execution environments that are isolated from each other, such as in separate virtual machines or sandboxes.

In the user space 1002, a developer operates in an integrated development environment 1006 and transmits a focal method 1012 to a test generation model 1008 in the prediction space 1004. The test generation model 1008 generates tests for the focal method 1014. In an aspect, the test generation model 1008 may be a neural transformer model with attention configured in an encoder-decoder configuration or in a decoder-only configuration. The code coverage prediction engine 1010 predicts the code coverage of the generated tests. If the test coverage of the generated tests is not satisfactory (block 1016—no), then the test generation model generates additional tests. If the test coverage of the generated tests is satisfactory (block 1016—yes), then the generated tests 1014 are returned to the integrated development environment 1006.

Exemplary Operating Environment

Figure 11:
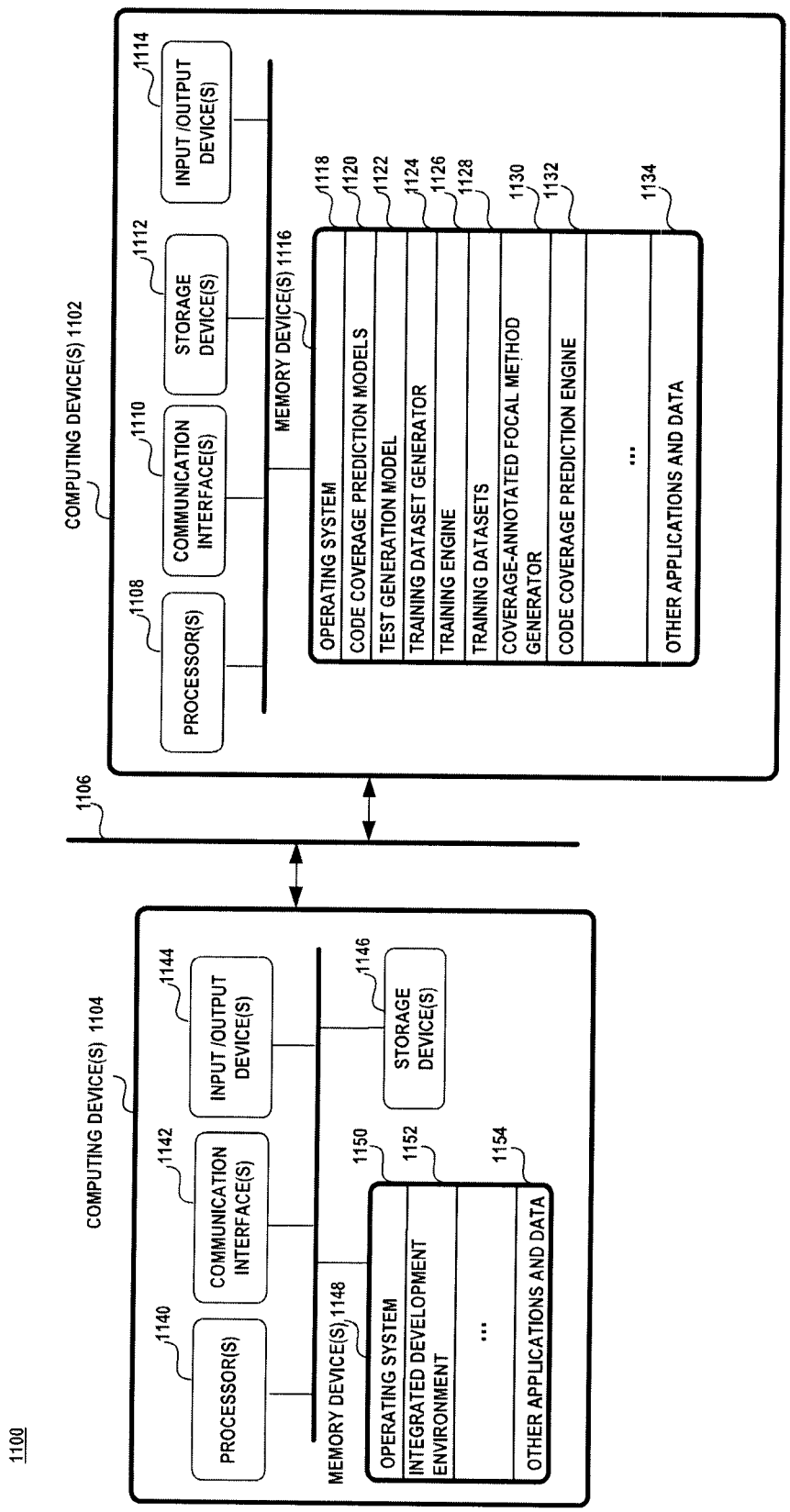
FIG. 11 is a block diagram illustrating an operating environment.

Attention now turns to a discussion of an exemplary operating environment. FIG. 11 illustrates an exemplary operating environment 1100 in which one or more computing devices 1102, 1104 are used in a code coverage prediction system. In one aspect, the training and usage of the code coverage prediction models is performed on computing devices 1102 and an integrated development environment used to implement the focal method and test cases exists on computing device 1104. However, it should be noted that the aspects disclosed herein are not constrained to any particular configuration of devices.

In alternate embodiments, the code coverage prediction system may be configured as a cloud service that trains and operates the code coverage prediction models as a service. A client device may transmit to the cloud service the inputs for the model (e.g., focal method, test cases) to generate/predict code coverage symbols and/or the coverage-annotated focal method which are returned to the client device. The interaction between the client device and the cloud service may be performed through various APIs.

Alternatively, the client device may include a source code editor or IDE using the code coverage prediction system as an add-on, extension, or plug-in module that operates as a feature of the source code editor or IDE. Other variations are possible and it should be noted that the operating environment is not limited to any particular configuration.

The computing devices 1102, 1104 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1100 may be configured in a network environment, a distributed environment, a multi-processor environment, or a stand-alone computing device having access to remote or local storage devices.

The computing devices 1102, 1104 may include one or more processors 1108, 1140, one or more communication interfaces 1110, 1142, one or more storage devices 1112, 1146, one or more input/output devices 1114, 1144, and one or more memory devices 1116, 1148. A processor 1108, 1140 may be any commercially available or customized processor and may include dual microprocessors and multi-processor architectures. A communication interface 1111, 1142 facilitates wired or wireless communications between the computing devices 1102, 1104 and other devices. A storage device 1112, 1146 may be computer-readable medium that does not contain propagating signals, such as modulated data signals transmitted through a carrier wave. Examples of a storage device 1112, 1146 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1112, 1146 in the computing devices 1102, 1104. The input/output devices 1114, 1144 may include a keyboard, mouse, pen, voice input device, touch input device, display, speakers, printers, etc., and any combination thereof.

A memory device 1116, 1148 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 1116, 1148 may also include one or more external storage devices or remotely located storage devices that do not pertain to propagated signals, such as modulated data signals transmitted through a carrier wave.

The memory device 1116, 1148 may contain instructions, components, and data. A component is a software program that performs a specific function and is otherwise known as a module, program, component, and/or application. The memory device 1116 may include an operating system 1118, code coverage prediction models 1120, a test generation model 1122, a training dataset generator 1124, a training engine 1126, training datasets 1128, a coverage-annotated focal method generator 1130, a code coverage prediction engine 1132, and other applications and data 1134. The memory device 1148 may include an operating system 1150, an integrated development environment 1152, and other applications and data 1154.

The computing devices 1102, 1104 may be communicatively coupled via a network 1106. The network 1106 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 1106 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of determining code coverage of a test case for a code snippet without building or executing the source code program containing the code snippet. The technical features associated with addressing this problem is a code coverage prediction model that generates a sequence of code coverage symbols indicating whether or not a line of code is adequately tested by the test case. The technical effect achieved is code coverage without instrumenting, building or executing the source code program.

The operations used to generate the annotated-coverage focal method need to be performed on a computing device. Hence, the operations performed are inherently digital. A human mind cannot interface directly with a CPU, or network interface card, or other processor, or with RAM or digital storage, to read and write the necessary data and perform the necessary operations and processing steps taught herein.

Embodiments are also presumed to be capable of operating "at scale", that is capable of handling larger volumes, in production environments or in testing labs for production environments as opposed to being mere thought experiments.

The technique described herein is a technical improvement over prior solutions that required a software program to be instrumented, build, and executed. The technique represents a viable alternative to execution-based code coverage solutions where program build and execution is too expensive, such as in the case of large software projects containing millions of lines of code and hundreds of dependencies. The approach disclosed herein is a viable alternative to execution-based code coverage that needs to be repeated multiple times iteratively.

The approach is advantageous when only a snippet of code is available but not the entire program, such as in a server-side test generation service. For example, in the scenario where a server utilizes a deep machine learning model to generate unit tests for a method of a program but does not have the entire codebase. The test cases cannot be executed on the server since the server needs the entire codebase which resides on the client or user device. The disclosed technique allows code coverage computation with limited code availability.

Conclusion

A system is disclosed comprising: one or more processors; and a memory that stores one or more programs that are configured to be executed by the one or more processors. The one or more programs include instructions to perform actions that: obtain a focal method and a corresponding test case; create a prompt including the focal method and the corresponding test case; generate, from a first deep machine learning model given the prompt, a sequence of code coverage symbols, wherein a code coverage symbol of the sequence of code coverage symbols indicates coverage of the test case for a respective line of source code of the focal method; align the sequence of coverage symbols with the focal method to produce an annotated-coverage focal method; and output the annotated-coverage focal method.

In an aspect, the code coverage symbols include a first code coverage symbol that represents coverage by the test case, a second code coverage symbol that represents no coverage by the test case, and a third code coverage symbol that represents an unreachable line of source code. In an aspect, the annotated-coverage focal method is output to an integrated development environment.

In an aspect, the one or more programs include instructions to perform actions that: obtain the corresponding test case from a second deep machine learning model, wherein the second deep machine learning model predicts the corresponding test case given the focal method.

In an aspect, the one or more programs include instructions to perform actions that: obtain a few-shot example including a second focal method, a second test case of the second focal method, and an annotated-coverage of the second focal method; and include the few-shot example in the prompt provided to the first deep machine learning model.

In an aspect, the first deep machine learning model is a neural transformer model with attention. In an aspect, the first deep machine learning model is a neural transformer model with attention in an encoder-decoder configuration. In an aspect, the first deep machine learning model is a neural transformer model with attention in a decoder-only configuration.

A computer-implemented method is disclosed, comprising: obtaining a focal method and a corresponding test case; predicting, from a first deep machine learning model given a line of source code of the focal method and the corresponding test case, one of a plurality of code coverage classes for the line of source code, wherein the plurality of code coverage classes includes a first class representing coverage of the line of source code by the test case and a second class representing non-coverage of the line of source code by the test case; associating a code coverage symbol with each code coverage class; marking the line of source code with a code coverage symbol associated with the predicted code coverage class of the line of source code; and outputting the focal method with the code coverage symbol.

In an aspect, the plurality of code coverage classes includes a third class representing an unreachable line of source code. In an aspect, the computer-implemented method, further comprises: generating the corresponding test case from a second deep machine learning model, wherein the second deep machine learning model predicts the corresponding test case given the focal method. In an aspect, the computer-implemented method, further comprises: receiving the focal method from a remote software development environment. The computer-implemented method of claim 9, further comprises: pre-training the first deep machine learning model on natural language text and source code.

In an aspect, the first deep machine learning model comprises an encoder neural transformer model with attention. In an aspect, the second deep machine learning model comprises a neural transformer model with attention.

A computer-implemented method, comprising: accessing a deep machine learning model trained to predict coverage of a test case for a first focal method of a source code program; creating a prompt for the deep machine learning model, wherein the prompt comprises the first focal method and the test case; obtaining a sequence of code coverage symbols from the deep machine learning model given the prompt, wherein a code coverage symbol of the sequence of code coverage symbols is associated with a respective line of source code of the first focal method, wherein the code coverage symbol represents coverage of the test case for the respective line of source code or no coverage of the test case for the respective line of source code; aligning the sequence of code coverage symbols with lines of source code of the first focal method; producing an annotated-coverage focal method from alignment of the sequence of code coverage symbols with the lines of source code of the first focal method; and outputting the annotated-coverage focal method.

In an aspect, the computer-implemented method further comprises: including a few-shot example in the prompt, wherein the few-shot example comprises a second focal method, a second test case corresponding to the second focal method, and coverage of the second test case for the second focal method. In an aspect, the code coverage symbol represents an unreachable line of source code of the first focal method.

In an aspect, the computer-implemented method, further comprises: receiving the first focal method and test case from an integrated development environment. In an aspect, the deep machine learning model is a neural transformer model with attention that predicts code coverage of a test case for a first focal method of a source code program as a translation task. In an aspect, the deep machine learning model is a neural transformer model with attention configured in a decoder-only configuration.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
one or more processors; and
a memory that stores one or more programs that are configured to be executed by the one or more processors, the one or more programs include instructions to perform actions that:
obtain a focal method and a corresponding test case;
create a prompt including the focal method and the corresponding test case;
generate, from a first deep machine learning model given the prompt, a sequence of code coverage symbols, wherein a code coverage symbol of the sequence of code coverage symbols indicates coverage of the test case for a respective line of source code of the focal method;
align the sequence of coverage symbols with the focal method to produce an annotated-coverage focal method; and
output the annotated-coverage focal method.

2. The system of claim 1, wherein the code coverage symbols include a first code coverage symbol that represents coverage by the test case, a second code coverage symbol that represents no coverage by the test case, and a third code coverage symbol that represents an unreachable line of source code.

3. The system of claim 1, wherein the annotated-coverage focal method is output to an integrated development environment.

4. The system of claim 1, wherein the one or more programs include instructions to perform actions that:
obtain the corresponding test case from a second deep machine learning model, wherein the second deep machine learning model predicts the corresponding test case given the focal method.

5. The system of claim 1, wherein the one or more programs include instructions to perform actions that:
obtain a few-shot example including a second focal method, a second test case of the second focal method, and an annotated-coverage of the second focal method; and
include the few-shot example in the prompt provided to the first deep machine learning model.

6. The system of claim 1, wherein the first deep machine learning model is a neural transformer model with attention.

7. The system of claim 1, wherein first deep machine learning model is a neural transformer model with attention in an encoder-decoder configuration.

8. The system of claim 1, wherein the first deep machine learning model is a neural transformer model with attention in a decoder-only configuration.

9. A computer-implemented method, comprising:
   obtaining a focal method and a corresponding test case;
   predicting, from a first deep machine learning model given a line of source code of the focal method and the corresponding test case, one of a plurality of code coverage classes for the line of source code, wherein the plurality of code coverage classes includes a first class representing coverage of the line of source code by the test case and a second class representing non-coverage of the line of source code by the test case;
   associating a code coverage symbol with each code coverage class;
   marking the line of source code with a code coverage symbol associated with the predicted code coverage class of the line of source code; and
   outputting the focal method with the code coverage symbol.

10. The computer-implemented method of claim 9, wherein the plurality of code coverage classes includes a third class representing an unreachable line of source code.

11. The computer-implemented method of claim 9, further comprising:
   generating the corresponding test case from a second deep machine learning model, wherein the second deep machine learning model predicts the corresponding test case given the focal method.

12. The computer-implemented method of claim 9, further comprising:
   receiving the focal method from a remote software development environment.

13. The computer-implemented method of claim 9, further comprising:
   pre-training the first deep machine learning model on natural language text and source code.

14. The computer-implemented method of claim 9, wherein the first deep machine learning model comprises an encoder neural transformer model with attention.

15. The computer-implemented method of claim 9, wherein the second deep machine learning model comprises a neural transformer model with attention.

16. A computer-implemented method, comprising:
   accessing a deep machine learning model trained to predict coverage of a test case for a first focal method of a source code program;
   creating a prompt for the deep machine learning model, wherein the prompt comprises the first focal method and the test case;
   obtaining a sequence of code coverage symbols from the deep machine learning model given the prompt, wherein a code coverage symbol of the sequence of code coverage symbols is associated with a respective line of source code of the first focal method, wherein the code coverage symbol represents coverage of the test case for the respective line of source code or no coverage of the test case for the respective line of source code;
   aligning the sequence of code coverage symbols with lines of source code of the first focal method;
   producing an annotated-coverage focal method from alignment of the sequence of code coverage symbols with the lines of source code of the first focal method; and
   outputting the annotated-coverage focal method.

17. The computer-implemented method of claim 16, further comprising:
   including a few-shot example in the prompt, wherein the few-shot example comprises a second focal method, a second test case corresponding to the second focal method, and coverage of the second test case for the second focal method.

18. The computer-implemented method of claim 16, wherein the code coverage symbol represents an unreachable line of source code of the first focal method.

19. The computer-implemented method of claim 16, further comprising:
   receiving the first focal method and test case from an integrated development environment.

20. The computer-implemented method of claim 16, wherein the deep machine learning model is a neural transformer model with attention that predicts code coverage of a test case for a first focal method of a source code program as a translation task.

* * * * *